3,069,416
PREPARATION OF 16α,17α-OXIDO-21-METHYL-Δ⁴-PREGNENE-21-OL-3,20-DIONE AND INTERMEDIATES
Sanford K. Figdor, Gales Ferry, Hans-Jürgen E. Hess, Groton, and Gerald D. Laubach, Niantic, Conn., assignors to Chas. Pfizer & Co., Inc., New York, N.Y., a corporation of Delaware
No Drawing. Filed May 11, 1960, Ser. No. 28,189
2 Claims. (Cl. 260—239.55)

This application is concerned with a new and useful process for the preparation of the valuable 21-esters of 16α,17α-oxido-21-methyl-Δ⁴-pregnene-21-ol-3,20-dione. This compound is described in copending patent application, Serial No. 3,995, filed January 22, 1960, which also describes the use of the compound in the preparation of adrenocortically active steroids. This application is also concerned with certain valuable intermediates useful for the preparation of 16α,17α-oxido-21-methyl-Δ⁴-pregnene-21-ol-3,20-dione.

The process of this application in one of its modifications is shown in the following synthetic sequence:

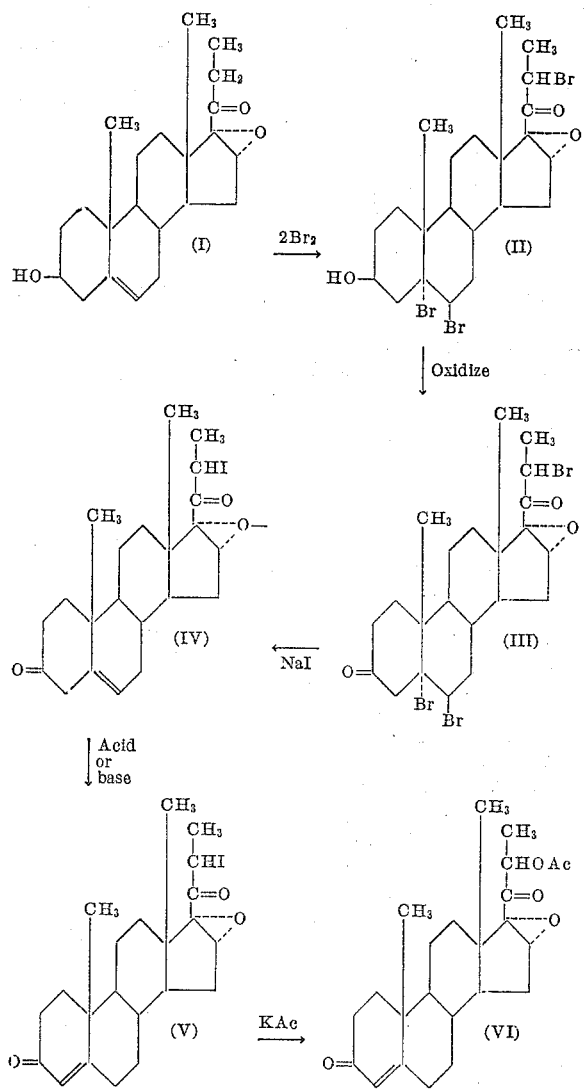

The starting compound used in practicing the process of this invention is described in copending and concurrently filed patent application, Serial No. 28,188, which also describes and claims the valuable new process by which it is prepared. This process may be shown as follows:

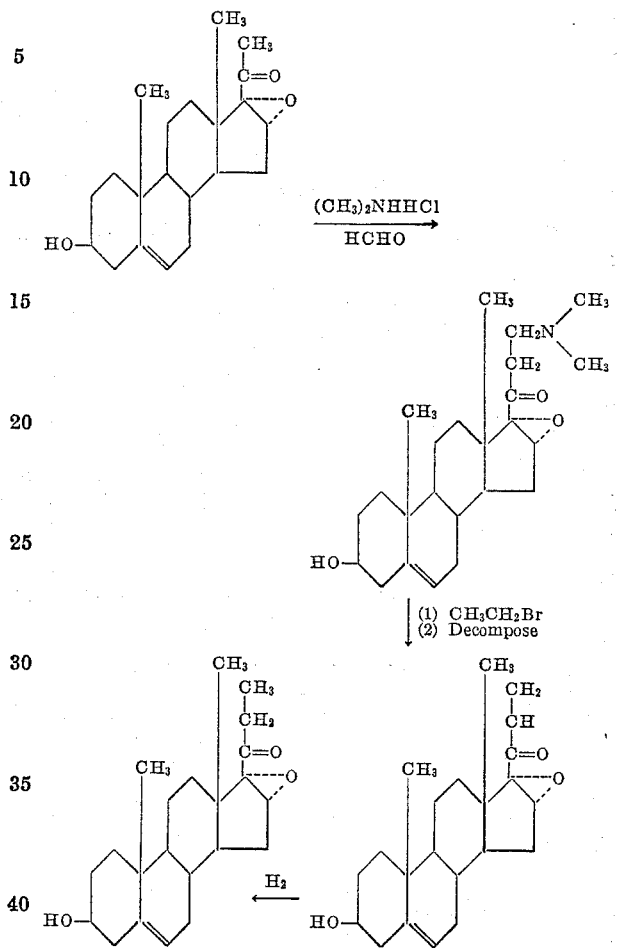

As will be seen, the starting compound is prepared from the known compound, 16α,17α-oxido-Δ⁵-pregnene-3β-ol-20-one (16,17-oxidopregnenolone).

In the first step of the conversion, 16,17-oxidopregnenolone is converted to 16α,17α-oxido-21-dimethylaminomethyl-Δ⁵-pregnene-3β-ol-20-one by reaction with an amine acid addition salt and formaldehyde. The amine salt may be symmetrical or non-symmetrical, cyclic or non-cyclic. Preferably, it is a lower alkyl amine salt containing up to four carbon atoms in each alkyl group. These latter are generally preferred since they are readily available at a reasonable price. Preferred amine salts include, for example, diethyl amine sulfate, methyl ethyl amine sulfate, di-n-butyl amine hydrobromide and ethyl isopropyl amine hydriodide. Hydrochloride salts are generally preferred and of these, dimethyl amine hydrochloride is the most desirable since it is most readily available and gives good yields. Further, it is sometimes desirable to add small amounts of acid before or during the reaction so as to maintain the pH of the reaction mixture at from about 2.5 to about 5.0. This is most conveniently accomplished with hydrochloric acid.

In carrying out the reaction, the reactants are mixed together in the selected solvent and maintained at a temperature of from about 90° C. to about 140° C. for from about two to about twenty-four hours. The preferred solvents for the reaction are alkanols containing up to five carbon atoms, although other lower aliphatic oxygenated solvents can be used. The preferred alkanols are n-propanol and n-butanol since they reflux at atmospheric pressure within the preferred temperature range. Obviously, however, higher boiling solvents can be used, although usually not at the reflux temperature. Similarly, lower boiling solvents such as methyl and ethyl alcohol are useful if the reaction is carried out under pressure. It is generally most convenient to employ an excess of the paraldehyde and amine salt, to insure as complete a reaction as possible of the more expensive pregnene derivatives. A molar excess of from about 50% to about 600% or even more can be used. The amount is not critical.

The reaction will often be carried out in an inert atmosphere, for example, a nitrogen atmosphere so as to minimize loss of reaction product by side reactions. This, however, is not necessary.

At the end of the reaction period, the desired product may be isolated by evaporating the solvent, preferably in vacuo, purified by triturating with hot dilute hydrochloric acid followed in the case of compounds forming soluble hydrochlorides with hot water. The water and dilute acid solutions are combined and made basic with dilute aqueous alkali, for example, 10% sodium carbonate, bicarbonate or similar reagent. Occasionally, the pure product will precipitate from the basic solution and may be recovered by filtration. If it does not precipitate, it may be extracted with a water immiscible lower hydrocarbon or halogenated hydrocarbon solvent such as ethylene chloride, chloroform, carbon tetrachloride, chlorobenzene, hexane or octane. The desired product is then recovered from the organic solvent by evaporation in vacuo. The extraction step may also be employed with those products which precipitate from the alkaline solution and thus increase the overall yield.

The amine prepared as described above is next converted to a quaternary ammonium halide using procedures generally employed for this purpose. Thus, for example, the amine is mixed in a lower alkanol solvent, e.g. methanol or ethanol, with an alkyl halide containing up to four carbon atoms and simply allowed to stand for from about six to about sixteen hours at from about 20° C. to about 30° C. Usually an excess of as much as fifty percent or more of alkyl halide will be used, but this is not essential. The solvent is removed, for example, by evaporation in vacuo and the product recovered as a residue. It may be purified by trituration with ether, acetone or other similar solvent. Methanol and ethanol are the preferred solvents for the reaction because of their good solubility characteristics and also because they can be readily evaporated due to their low boiling point.

The preferred alkyl halides are methyl or ethyl bromide. These are preferred because they are the easiest to obtain and because at the temperatures used, they are liquids. Other alkyl halides such as methyl or ethyl chloride can be used, but they are usually less convenient since they are gases at ordinary temperature and pressure. Butyl bromide, methyl iodide, or isopropyl chloride may be employed. The iodides are generally not preferred because they form insoluble precipitates when the quaternary compound is decomposed to form the propenoyl compounds in accordance with the equations shown below. They can be used, however, and the product purified by repeated recrystallizations or by standard chromatographic procedures.

The quaternary compound thus prepared is converted to a 17β-propylene compound. This is accomplished by reaction with water or aqueous alkali for from about one to about six hours at a temperature of from about 20° C. to about 30° C. Temperatures below and above this preferred range can be used although less satisfactorily. Thus, if a temperature considerably below 20° C. is used, the reaction is too slow to be practical and if a temperature considerably above 30° C. is used, there may be some decomposition of the desired product.

Although the desired products form by simple reaction with water, they form more readily and often in higher yields if the reaction is carried out at an alkaline pH of from about 7.5 to about 12. The desired alkalinity may be effected by adding a small amount of aqueous solution containing from about 2% to about 10% by weight of an alkali or alkaline earth metal hydroxide, oxide, carbonate, bicarbonate or alkali metal acetates, tartrates or citrates.

In summary, the desired products are formed by mixing the quaternary lower alkyl ammonium halides illustrated above in an aqueous solution at a pH of from about 7 to about 12 at a temperature of from about 20° C. to about 30° C. for a period of from about one to about six hours.

The aqueous solution may contain a small amount of tert-butanol to enhance solubility.

Usually the desired product will precipitate from the reaction mixture as it forms and reaction is complete when no more precipitate forms. Occasionally, however, the desired product will not precipitate. In these cases, the product may be isolated by extraction with a water immiscible hydrocarbon or halogenated hydrocarbon solvent including, for example, ethylene dichloride, chloroform, carbon tetrachloride, chlorobenzene and benzene. It is, of course, possible to use an extraction procedure whether or not the product precipitates and this may often result in better overall yields. If an extraction step is used, it may be desirable to add a small amount of acid to the aqueous mixture to insure that all of the amine by-product of the main reaction is converted to an acid salt which is insoluble in the organic solvent.

Occasionally, when a quaternary iodide is used, the iodide salt which forms is insoluble in water. Obviously, this could lead to contamination of the final product particularly if it is insoluble in water and co-precipitates with the iodide salt. In these instances, and in any other instances where there is co-precipitation of the main product and by-product, it is always preferred to use an extraction step.

The propenoyl compounds are isolated from the organic solvent by removal of the solvent in vacuo, preferably after drying the solvent using an anhydrous drying agent such as sodium or magnesium sulfate. The product may be further purified by recrystallization from a suitable solvent such as methyl alcohol.

It is also possible to prepare the propenoyl compound directly from the amine. Thus, the amine acid addition salt may be taken up in ethanol, the quaternizing agent together with a small amount of a basic reagent such as potassium acetate, is added and the mixture is refluxed for approximately five hours. The product is isolated by removal of most of the solvent and precipitation with water.

In the next step of this process, the propenoyl group at the 17β-position is reduced to a propanoyl group with hydrogen in the presence of a catalyst. In carrying out the reduction process, i.e., the hydrogenation process, it is preferred to employ temperatures of from about 15° C. to about 35° C. although somewhat higher temperatures are not deleterious. Hydrogen pressures at from slightly below atmospheric to about 10 atmospheres may be employed. Generally speaking, room temperature and atmospheric pressure are simplest and are fully satisfactory. The reduction should be terminated when the theoretical amount of hydrogen has been adsorbed. This can be readily determined by observing the change in pressure of the hydrogen. At atmospheric pressure using laboratory quantities of reactants, the theoretical amount of hydrogen is generally consumed in less than an hour. For commercial operations, the duration of the reaction may be somewhat increased. The time of the reaction is not critical.

The products of the reaction may be isolated with relative ease; preferably, the catalyst is filtered and the solvent removed in vacuo. Often, the desired product is obtained in sufficient purity for the next reaction by simply removing the solvent. In other cases, it may be desirable to subject the material to conventional purification procedures such as recrystallization or chromatography.

The preferred catalyst for the reaction is palladium and this may be used with or without a carrier. Especially useful catalysts include 10% palladium on carbon or palladium on calcium carbonate. The proportion of catalyst to reactants is not critical and may vary widely. Between about 10% and about 500% by weight of the steroid is satisfactory and between 50% and 100% is preferred.

The hydrogenation should be conducted in a liquid system. The choice of solvent is not critical. Suitable solvents include lower aliphatic oxygenated solvents containing up to five carbon atoms such as alkanols, esters or ketones including methanol, ethanol, ethyl acetate, propyl acetate, acetone and methyl isopropyl ketone.

There is thus prepared the starting compound used in the process of this invention. This compound is $16\alpha,17\alpha$-oxido-21-methyl-$\Delta^5$-pregnene-3$\beta$-ol-20-one.

In the first step of this valuable synthetic method, the starting compound is converted to $5\alpha,6\beta,21$-tribromo-$16\alpha,17\alpha$-oxido-21-methyl-pregnane-3$\beta$-ol-20-one by reaction with at least 2 molar equivalents of bromine. The reaction is effected by treating the steroid compound with from about two to about two and one-half molar equivalents of bromine at a temperature of from about 0° C. to about 40° C., preferably 20° C. to 30° C. for a period of from about one-half to about four hours.

Suitable solvents include hydrocarbon and halogenated hydrocarbon solvents containing up to seven carbon atoms and acetic acid. Methylene chloride, ethylene chloride, chloroform, carbon tetrachloride, benzene, toluene and chlorobenzene may be mentioned by way of example. Mixtures of solvents can also be employed.

In a preferred method, the steroid is taken up in the selected solvent and 2 molar equivalents of bromine solution comprising bromine dissolved in the same solvent is added while maintaining the temperature of from about 20° C. to about 30° C. The mixture is then allowed to stand at this same temperature until most of the bromine color has disappeared. This usually takes from about two to about four hours.

The product may be isolated by any of a number of means known to those skilled in the art. In one especially suitable method, a slight vacuum is first applied to the mixture to remove most of the hydrogen bromide which forms in the reaction. The solution is then washed with an alkaline reagent and with water. Suitable alkaline reagents include, for example, 5% aqueous sodium carbonate, bicarbonate, hydroxide or equivalent potassium salts. The organic layer is then dried over an anhydrous drying agent such as sodium or magnesium sulfate, filtered and the solvent removed in vacuo to leave the desired product as a residue.

The hydroxyl group at the 3-position is next oxidized to form a 3-keto-compound. The choice of oxidizing agent is not critical, although it is preferred to use chromic acid in accordance with standard procedures. One procedure which is especially effective is to use 8 N chromic acid prepared by dissolving 66.7 g. of chromic acid in a minimum of water and adding 53.3 ml. of concentrated sulfuric acid. The mixture is then made up to a total volume of 250 ml. by the addition of acetone. The use of this reagent is illustrated in the examples.

Alternatively, the standard chromic acid-acetic acid couple can be employed. This reagent is prepared by dissolving sufficient chromium trioxide in a 9:1 acetic acid-water mixture to provide a solution containing 76 mgs. of chromium trioxide per ml.

Other oxidizing agents well known in the art can also be used.

In the next step of this procedure, the tribromo compound is converted to a 21-iodo-$\Delta^5$-pregnene. The reaction is carried out by reaction of the steroid with from about 4 to about 7 molar equivalents of sodium iodide in a lower aliphatic ketone solvent containing up to five carbon atoms. Acetone and other ketones which are at least 30% soluble in water are preferred since the product may then be isolated by simply pouring the reaction mixture into water. With water immiscible solvents, the product is isolated by distilling off the solvent. The residue was then washed with water to remove excess inorganic reagent.

The temperature of the reaction is from about 20° C. to about 40° C., preferably from about 25° C. to about 30° C. The duration of the reaction is from about 15 to about 30 hours.

The compound prepared by this procedure is $16\alpha,17\alpha$-oxido-21-iodo-21-methyl-$\Delta^5$-pregnene-3,20-dione. This compound is isomerized to the corresponding $\Delta^4$-compound. Isomerization is effected with either sulfuric acid or ammonium hydroxide. Of these, ammonium hydroxide is preferred since with this reagent, there is less danger of opening the epoxide ring at the 16,17-position. In either event, only small amounts of the isomerizing agent are used, say, for example, from about 2% to about 8% by volume. Suitable solvents include lower alkanols containing up to five carbon atoms. Methanol and ethanol are especially suitable.

In carrying out the reaction, the $\Delta^5$-compound is taken up in the solvent containing the isomerizing agent and maintained at a temperature of from about 20 to about 40° C. for a period of from about 10 to about 60 minutes.

The product may be isolated by any of a number of means which will be apparent to those skilled in the art. For example, one may neutralize the isomerizing agent by the addition of dilute acid or dilute base and concentrate the resulting solution to a small volume. The desired product is then precipitated by the addition of water. Alternatively, one may completely remove the solvent by distillation in vacuo, to leave the desired product as a residue. The small amount of inorganic salt contained in the residue is removed by trituration with water. The pure product may also be obtained by taking up the residue in a halogenated hydrocarbon solvent containing up to two carbon atoms such as chloroform, methylene chloride or ethylene chloride, filtering to remove the insoluble material and evaporation of the solvent.

Compounds II, III, IV and V shown above are new and it is specifically intended to include them within the scope of this invention.

In the last step of the process of this invention, the 21-iodo compound is converted to an acyloxy compound by replacement of the iodine atom with an acyloxy group containing up to five carbon atoms. Basically, this is a reaction with a sodium or potassium salt of an organic acid, and it may be carried out either by direct addition of the sodium or potassium salt to a solution of the iodo steroid or by in situ formation of the salt in the solution containing the steroid. In either event, the reaction is between the iodo steroid and the salt, for example, sodium or potassium acetate, propionate, butyrate or valerate and takes place in a lower aliphatic oxygenated solvent containing up to five carbon atoms including esters such as ethyl acetate or ketones such as acetone or methyl isopropyl ketone. The reaction takes place at a temperature of from about 40° C. to about 100° C. during a period of from about four to about twenty-four hours. A large excess of salt is generally employed to insure complete reaction of the steroid. Thus, a quantity of the salt ranging from about 200% to about 2000% or even more is used with from about 1000% to about 2000% being preferred.

In a preferred operation, the salt is generated in situ by adding the steroid in acetone to an acetone solution containing equimolar portions of potassium bicarbonate and acetic acid or other selected acid and refluxing the mixture for from about 10 to about 16 hours. A sufficient quantity of acid and salt should be used to generate the desired excess of the potassium salt.

Whichever procedure is used, the product may be isolated by removing the solvent in vacuo and washing the residue with a minimum amount of water to remove the inorganic salts. Alternatively, the reaction mixture may be diluted with water and the resulting solution filtered to obtain the desired compound or extracted with an organic solvent. Suitable solvents include hydrocarbon and halogenated hydrocarbon solvents containing up to seven carbon atoms including for example, benzene, toluene, chlorobenzene, carbon tetrachloride or chloroform. The product is isolated from the organic solution preferably by removal of the solvent in vacuo. It is desirable although not necessary to dry the organic solution over an anhydrous drying agent such as sodium or magnesium sulfate before evaporating the solvent.

As stated above, the compounds prepared by the process of this invention are useful in the preparation of adrenocortically active steroids. These steroids are described and claimed in copending patent application, Serial No. 3,996, filed January 22, 1960.

In the first step for the conversion of a product of this invention, the product is converted to a 16β-bromo-17α-hydroxy compound, that is, a bromohydrin by opening the epoxide ring with hydrogen bromide.

The bromohydrin is formed by treating the epoxide in a reaction inert organic solvent, preferably a lower aliphatic organic acid such as acetic or butyric acid with hydrogen bromide dissolved in a similar reaction inert solvent. In preferred operations, the steroid is dissolved in acetic acid and the hydrogen bromide is added in the form of a 20% to 32% solution of this reagent in acetic acid. The reaction is carried out at from about 10° C. to about 30° C., preferably 15° C. to 25° C. The reaction mixture is simply allowed to stand at the selected temperature and the bromohydrin forms. At least a molar equivalent of hydrogen bromide is used and preferably an excess of from about 10% to about 100% is employed.

The product may be isolated from the reaction mixture by evaporating the solvent or by comingling the mixture with cold water. In the event that the solvent is evaporated, it may be helpful to wash the residue with a small amount of ether to induce crystallization. If the water method is used, the product precipitates and is recovered by filtration.

In the next step of the process of this invention, the bromine atom at the 16-position is removed by reductive dehalogenation with Raney nickel.

Suitable solvents for carrying out the reaction with Raney nickel include reaction inert organic solvents such as lower aliphatic oxygenated solvents including ethers, alcohols, acids and ketones containing up to five carbon atoms. Methanol, ethanol, propanol, isopropanol, pentanol, acetone, methyl isopropyl ketone, dioxane, acetic acid and propionic acid are examples of suitable solvents. The use of a mixed solvent such as methanol-acetic acid is sometimes advantageous.

The amount of Raney nickel used is not critical although to insure the most economical utilization of the steroid starting material, it is generally preferred to use an excess of this dehalogenating agent. From four to twenty grams of Raney nickel per gram of steroid has been found to provide suitable yields. The preferred excess, as will be recognized by those skilled in the art, will depend upon the degree of activity of the Raney nickel. This, in turn, will depend upon its previous treatment. With Raney nickel, which has been washed first with water, then with acetic acid, then with methanol and finally with acetone in accordance with known procedures, it is usually found that from ten to fifteen grams of Raney nickel per gram of steroid give suitable results. However, the Raney nickel can be used without previous treatment or with other known treatments and still function as a dehalogenating agent when employed in accordance with the procedures of this invention.

The duration of the reaction is not critical, and depends only on the degree of activity of the Raney nickel. This degree of activity is readily determined by tests well known to those skilled in the art, and include, for example, the reduction of known compounds requiring varying degrees of reducing activity. Reaction periods as short as five minutes or as long as twenty-four hours can be used. It is, however, preferred to carry out the reaction during a period of from about one-half hour to about six hours.

For optimum yields, the temperature of the reaction should be controlled so that it does not rise above 30° C. during the reaction period and it is best to carry out the reaction between 0° C. and 15° C.

Although it is not essential, it is preferred to carry out the reaction in an inert atmosphere such as a nitrogen atmosphere. This assures the most efficient use of the Raney nickel by minimizing its reaction with atmospheric oxygen.

An 11β-hydroxyl group may be introduced using, for example, *Curvularia lunata* as described and claimed in U.S. Patent 2,658,023, issued November 3, 1953.

There is thus produced an adrenocortically active 21-ester of 21-methyl-Δ⁴-pregnene-11β,17α,21-triol-3,20-dione.

The following examples are given solely for the purpose of illustration and are to be construed as limitations of this invention, many apparent variations of which are possible without departing from the spirit or scope thereof.

The following preparations are illustrative of the procedure used to prepare the starting compound employed in this invention.

PREPARATION I

*16α,17α-Oxido-21-Dimethylaminomethyl-Δ⁵-Pregnene-3β-Ol-20-One*

A total of 35 grams of 16α,17α-oxido-Δ⁵-pregnene-3β-ol-20-one was taken up in 500 ml. of n-amyl alcohol containing 20 grams of paraldehyde, 60 grams of dimethylamine hydrochloride and 2 ml. of dilute hydrochloric acid. The mixture was refluxed for 2 hours in a nitrogen atmosphere and filtered. The residue was digested with 150 ml. of hot 0.25 N hydrochloric acid and filtered. The filtrate was adjusted to an approximate pH of 11 with 10% sodium carbonate. The aqueous solution was extracted with chloroform. The chloroform solution was dried over anhydrous magnesium sulfate, filtered and the desired product obtained by evaporating the solvent in vacuo.

PREPARATION II

*16α,17α-Oxido-21-Dimethylaminomethyl-Δ⁵-Pregnene-3β-Ol-20-One Ethyl Bromide*

A solution of 7.5 grams of the product obtained in Preparation I in 150 ml. of ethanol containing a 50% molar excess of ethyl bromide was allowed to stand at 25° C. for 16 hours and the mixture was then evaporated to dryness in vacuo. The residue was triturated with acetone and the desired product recovered by filtration.

PREPARATION III

*16α,17α-Oxido-21-Methylene-Δ⁵-Pregnene-3β-Ol-20-One*

A solution of 200 mgs. of the product obtained in the previous preparation in 10 ml. of water was prepared and clarified by filtration. To the solution, there was added 68 mgs. of sodium bicarbonate in 2 ml. of water at 25° C. A white precipitate separated and the suspension was stirred for one hour, filtered, washed with water and dried in vacuo.

PREPARATION IV

*16α,17α-Oxido-21-Methylene-Δ⁵-Pregnene-3β-Ol-20-One*

A total of 25 grams of 16α,17α-oxido-Δ⁵-pregnene-3β-ol-20-one was taken up in 350 ml. of methanol containing 12 grams of paraldehyde and 40 grams of dimethylamine hydrochloride. The mixture was maintained at 90° C. under pressure for 24 hours. The hot mixture was filtered and the solution evaporated in vacuo. The residue was taken up in 400 ml. of ethanol containing a 50% molar excess of ethyl bromide and 2 grams of potassium acetate was added. The mixture was refluxed for 5 hours and evaporated to one-fifth volume. The desired product was precipitated by the addition of 4 volumes of water and collected by filtration.

PREPARATION V $16\alpha,17\alpha$-Oxido-21-Methyl-$\Delta^5$-Pregnene-$3\beta$-Ol-20-One A total of 1 gram of the product obtained in the previous preparation was taken up in 300 ml. of methanol containing 1 gram of 5% palladium on calcium carbonate at 15° C. and agitated under hydrogen at 2 atmospheres pressure. Reaction was stopped after one molar equivalent of hydrogen had been adsorbed and the catalyst was removed by filtration. The catalyst was washed with an additional 50 ml. of methanol and the filtrates combined. The solvent was removed in vacuo leaving the desired product as a residue.

The following examples are illustrative of the process of this invention.

EXAMPLE I $5\alpha,6\beta,21$-Tribromo-$16\alpha,17\alpha$-Oxido-21-Methyl-Pregnane-$3\beta$-Ol-20-One A total of 5 grams of the product obtained in Preparation V was taken up in 200 ml. of chloroform and 2 molar equivalents of bromine in 100 ml. of carbon tetrachloride was added while maintaining the temperature at 0° C. The mixture was allowed to stand for 4 hours at this temperature. A slight vacuum was applied to remove the hydrogen bromide formed during the reaction. The solution was then washed three times with equal volumes of 5% sodium carbonate and finally with water. The organic layer was separated, dried over anhydrous magnesium sulfate, filtered and the desired product obtained by removing the solvent in vacuo.

EXAMPLE II $5\alpha,6\beta,21$-Tribromo-$16\alpha,17\alpha$-Oxido-21-Methyl-Pregnane-$3\beta$-Ol-20-One A total of 5 grams of the product obtained in Preparation V was taken up in 200 ml. of acetic acid and 2 molar equivalents of bromine in 100 ml. of acetic acid was added while maintaining the temperature at 40° C. The mixture was allowed to stand for one-half hour at this temperature. The product was isolated after concentration in vacuo to one-half volume, by precipitation with water.

EXAMPLE III $5\alpha,6\beta,21$-Tribromo-$16\alpha,17\alpha$-Oxido-21-Methyl-Pregnane-$3\beta$-Ol-20-One A total of 5 grams of the product obtained in Preparation V was taken up in 200 ml. of chlorobenzene and 2½ molar equivalents of bromine in 100 ml. of chlorobenzene was added while maintaining the temperature at 25° C. The mixture was allowed to stand for 1 hour at this temperature. The product was isolated as described in Example I using 5% potassium carbonate as the alkaline reagent.

EXAMPLE IV $5\alpha,6\beta,21$-Tribromo-$16\alpha,17\alpha$-Oxido-21-Methyl-Pregnane-3,20-Dione A total of 20 grams of the product obtained in Example III in 1500 ml. of acetone at 10° C. was treated with 30 ml. of 8 N chromic acid reagent added in one portion with vigorous stirring. After 5 minutes, the reaction temperature rose to 22° C. and the entire mixture was poured into 10 liters of water, which caused precipitation of the desired compound. It was collected by filtration and dried.

EXAMPLE V $5\alpha,6\beta,21$-Tribromo-$16\alpha,17\alpha$-Oxido-21-Methyl-Pregnane-3,20-Dione To a solution of 5 grams of the product obtained in Example III, there was added 15 ml. of a solution of chromium trioxide in 9:1 acetic acid-water solution containing 76 mgs. of chromium trioxide per ml. of solution. The mixture was kept at room temperature during the addition and for an additional 4 hours. The desired product was precipitated by the addition to water and collected by filtration.

EXAMPLE VI $5\alpha,6\beta,21$-Tribromo-$16\alpha,17\alpha$-Oxido-21-Methyl-Pregnane-3,20-Dione Chromium anhydride (0.125 gram) was added to 15 ml. of pyridine at approximately 5° C. and the mixture allowed to warm spontaneously to room temperature. To this solution, there was added 2.5 grams of the product obtained in Example III in 20 ml. of pyridine and the mixture was allowed to stand at room temperature for 24 hours. The solution was extracted with ether and the ether solution washed twice with 5% aqueous hydrochloric acid and then with water. The ether layer was dried over anhydrous sodium sulfate, filtered and the desired product obtained by removal of the ether in vacuo.

EXAMPLE VII $5\alpha,6\beta,21$-Tribromo-$16\alpha,17\alpha$-Oxido-21-Methyl-Pregnane-3-20-Dione A solution of 0.5 gram of sodium dichromate dihydrate in 10 ml. of glacial acetic acid, was added over a 30-minute period to 0.25 gram of the product obtained in Example III in 50 ml. of 1:1 glacial acetic acid-benzene at 10° C. After 1 hour, an additional 0.3 gram of the oxidizing agent in 7 ml. of solvent was added and the mixture left standing for 24 hours at 10° C. It was poured into aqueous sodium bisulfite solution and the solution extracted with ether. The organic layer was washed with water until the washings were neutral, dried over anhydrous sodium sulfate, filtered and the ether removed in vacuo to isolate the desired product.

EXAMPLE VIII $16\alpha,17\alpha$-Oxido-21-Iodo-21-Methyl-$\Delta^5$-Pregnene-3,20-Dione A total of 5 grams of $5\alpha,6\beta,21$-tribromo-$16\alpha,17\alpha$-oxido-21-methyl-pregnane-3,20-dione was taken up in 200 ml. of acetone and 4 molar equivalents of sodium iodide was added while maintaining the temperature at 20° C. The mixture was allowed to stand for 30 hours and was then poured into water to precipitate the desired product. It was isolated by filtration, washed with water and air-dried.

EXAMPLE IX $16\alpha,17\alpha$-Oxido-21-Iodo-21-Methyl-$\Delta^5$-Pregnene-3,20-Dione A total of 5 grams of $5\alpha,6\beta,21$-tribromo-$16\alpha,17\alpha$-oxido-21-methyl-pregnane-3,20-dione was taken up in 200 ml. of methyl ethyl ketone and 7 molar equivalents of sodium iodide was added while maintaining the temperature at 30° C. The mixture was allowed to stand at this temperature for 15 hours and the product isolated as described in the previous example.

EXAMPLE X $16\alpha,17\alpha$-Oxido-21-Iodo-21-Methyl-$\Delta^5$-Pregnene-3,20-Dione A total of 5 grams of $5\alpha,6\beta,21$-tribromo-$16\alpha,17\alpha$-oxido-21-methyl-pregnane-3,20-dione was taken up in 200 ml.

of methyl isopropyl ketone and 5 molar equivalents of sodium iodide was added while maintaining the temperature at 30° C. The mixture was allowed to stand for 20 hours at this temperature and the product isolated by removal of the solvent in vacuo. It was washed with water and air-dried.

EXAMPLE XI

*16α,17α-Oxido-21-Iodo-21-Methyl-Δ⁴-Pregnene-3,20-Dione*

A total of 5 grams of the product prepared in Example X was taken up in 150 ml. of methanol containing 3 ml. of concentrated ammonium hydroxide. The mixture was stirred at 20° C. for one hour. The ammonium hydroxide was neutralized by the addition of acetic acid and the solution concentrated to one-fifth volume. The desired product was precipitated by the addition of water. It was isolated by filtration, washed with water and air-dried.

EXAMPLE XII

*16α,17α-Oxido-21-Iodo-21-Methyl-Δ⁴-Pregnene-3,20-Dione*

A total of 5 grams of the product obtained in Example X was taken up in 150 ml. of n-amyl alcohol containing 12 ml. of sulfuric acid. The mixture was maintained at 40° C. for 10 minutes. The sulfuric acid was neutralized by the addition of ammonium hydroxide, and the solvent removed in vacuo. The residue was triturated with water and filtered to obtain the desired product.

EXAMPLE XIII

*16α,17α-Oxido-21-Iodo-21-Methyl-Δ⁴-Pregnene-3,20-Dione*

A total of 5 grams of the product obtained in Example X was taken up in 150 ml. of ethanol containing 12 ml. of ammonium hydroxide. The mixture was maintained at 40° C. for 10 minutes and the product isolated as in Example XI.

EXAMPLE XIV

*16α,17α-Oxido-21-Iodo-21-Methyl-Δ⁴-Pregnene-3,20-Dione*

A total of 5 grams of the product obtained in Example X was taken up in 150 ml. of isopropanol containing 3 ml. of sulfuric acid. The mixture was maintained at 20° C. for 60 minutes and the product isolated as in Example XII.

EXAMPLE XV

*16α,17α-Oxido-21-Methyl-Δ⁴-Pregnene-21-Ol-3,20-Dione 21-Acetate*

A mixture containing 10 grams of potassium bicarbonate and an equimolar portion of acetic acid in 1 liter of acetone was prepared. To this mixture there was added 7.3 grams of 16α,17α-oxido-21-iodo-21-methyl-Δ⁴-pregnene-3,20-dione in 3.6 liters of acetone. The mixture was refluxed for 16 hours and concentrated to a volume of approximately 100 ml. in vacuo. To the concentrate, there was added 275 ml. of water and the resulting solution was extracted three times with 300 ml. portions of chloroform. The combined chloroform extracts were washed successively with one 200 ml. portion of water, one 200 ml. portion of aqueous sodium bicarbonate and finally with a 200 ml. portion of water. The organic layer was separated, dried over magnesium sulfate, filtered and the desired product obtained by removal of the solvent in vacuo.

This procedure was also used to prepare the formate, propionate, butyrate and valerate esters of this compound.

EXAMPLE XVI

*16α,17α-Oxido-21-Methyl-Δ⁴-Pregnene-21-Ol-3,20-Dione 21-Acetate*

A mixture containing 10 grams of the product obtained in Example XI in 200 ml. of dimethyl formamide was prepared and a 2000% molar excess of potassium acetate was added. The mixture was maintained at 100° C. for 4 hours and the solvent removed in vacuo. The residue was washed with water, filtered and dried to yield the desired product.

The formate, propionate, butyrate, isobutyrate and valerate esters were similarly prepared.

EXAMPLE XVII

*16α,17α-Oxido-21-Methyl-Δ⁴-Pregnene-21-Ol-3,20-Dione 21-Acetate*

A mixture containing 10 grams of the product obtained in Example XII in 150 ml. of methyl isopropyl ketone was prepared and a 200% molar excess of sodium acetate was added. The mixture was maintained at 40° C. for 24 hours and the solvent removed in vacuo. The residue was washed with water, filtered and dried to yield the desired product.

The formate, propionate, butyrate, isobutyrate and valerate esters were similarly prepared.

What is claimed is:

1. A process which comprises reacting a compound having the formula:

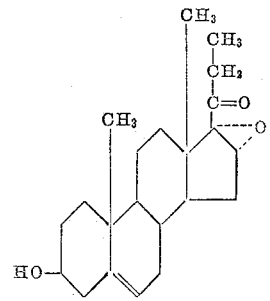

with from at least 2 to about 2½ molar equivalents of bromine in a solvent selected from the group consisting of hydrocarbon and halogenated hydrocarbon solvents containing up to seven carbon atoms and acetic acid for a period of from about one-half to about four hours at a temperature of from about 0° C. to about 40° C. to produce a compound having the formula:

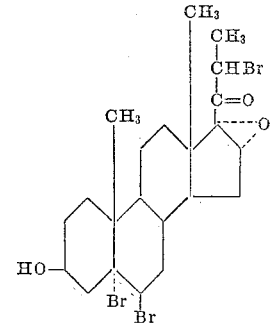

oxidizing said compound to produce a compound having the formula:

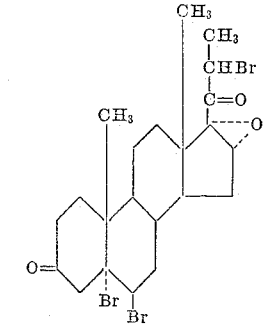

reacting said compound with from about 4 to about 7 molar equivalents of sodium iodide in an aliphatic ketone solvent containing up to five carbon atoms at a temperature of from about 20° C. to about 30° C. for a period of from about 15 to about 30 hours to produce a compound having the formula:

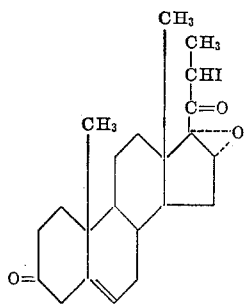

isomerizing said compound by reaction with from about 2% to about 8% by volume of a reagent selected from the group consisting of ammonium hydroxide and sulfuric acid in an alkanol solvent containing up to five carbon atoms for a period of from about 10 to about 60 minutes at a temperature of from about 20° C. to about 40° C. to produce a compound having the formula:

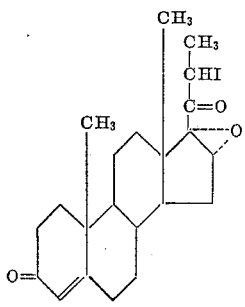

and reacting said compound with from about a 200% molar excess to about a 2000% molar excess of a reagent selected from the group consisting of sodium and potassium salts of organic acids containing up to five carbon atoms in a solvent selected from the group consisting of dimethyl formamide and aliphatic esters and ketones containing up to five carbon atoms at a temperature of from about 40° C. to about 100° C. for a period of from about 4 to about 24 hours to produce a compound having the formula:

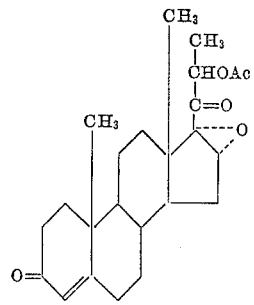

wherein Ac is an acyl hydrocarbon group containing only carbon, hydrogen and oxygen up to a total of five carbon atoms.

2. 16α,17α-oxido-21-iodo-21-methyl-$\Delta^5$-pregnene-3,20-dione.

References Cited in the file of this patent
UNITED STATES PATENTS

| | | |
|---|---|---|
| 2,874,154 | Stork et al. | Feb. 17, 1959 |
| 2,921,065 | Loken | Jan. 12, 1960 |
| 2,956,052 | Cole et al. | Oct. 11, 1960 |